United States Patent [19]

Furutani et al.

[11] Patent Number: 5,428,274
[45] Date of Patent: Jun. 27, 1995

[54] DRIVE CONTROL APPARATUS OF SERIES HYBRID VEHICLE

[75] Inventors: Masayuki Furutani, Susono; Yoshihide Nii, Fuji; Kohsuke Suzui; Yoshiyuki Nakamura, both of Susono, all of Japan

[73] Assignee: Toyota Jidosha Kabushiki Kaisha, Japan

[21] Appl. No.: 977,782

[22] Filed: Nov. 17, 1992

[30] Foreign Application Priority Data

Nov. 22, 1991 [JP] Japan .................. 3-307672

[51] Int. Cl.6 ........................... B60L 11/12
[52] U.S. Cl. .................. 318/139; 318/148; 318/106
[58] Field of Search ............. 180/65.3, 4.8; 318/139-158, 105-110; 322/7, 13, 14, 16, 39

[56] References Cited

U.S. PATENT DOCUMENTS

| | | | |
|---|---|---|---|
| 3,792,327 | 2/1974 | Waldorf | 318/139 |
| 4,187,436 | 2/1980 | Etienne | 290/27 |
| 4,306,156 | 12/1981 | Monaco et al. | 290/17 |
| 4,313,080 | 1/1982 | Park | 320/61 |
| 4,335,429 | 6/1982 | Kawakatsu | 364/424 |
| 4,407,132 | 10/1983 | Kawakatsu et al. | 60/716 |
| 4,444,285 | 4/1984 | Stewart et al. | 180/65.4 |
| 4,547,678 | 10/1985 | Metzner et al. | 290/40 C |
| 4,947,123 | 8/1990 | Minezawa | 324/427 |
| 5,081,365 | 1/1992 | Field et al. | 290/45 |
| 5,083,077 | 1/1992 | Wallace et al. | 322/32 |
| 5,172,784 | 12/1992 | Varela, Jr. | 180/65.4 |
| 5,264,764 | 11/1993 | Kuang | 318/139 |

FOREIGN PATENT DOCUMENTS

| | | |
|---|---|---|
| 0502951 | 6/1991 | European Pat. Off. . |
| 3025756 | 7/1980 | Germany . |
| 31112629 | 3/1981 | Germany . |
| 60-77607 | 2/1985 | Japan . |
| 62-27603 | 6/1987 | Japan . |
| 62-27604 | 6/1987 | Japan . |

OTHER PUBLICATIONS

Japan Patent Abstract Publication No. JP-56145702, publicaiton date Nov. 12, 1981.
Japan Patent Abstract Publication No. JP-56132102, publication date Jun. 16, 1981.
European Search Report dated Jan. 20, 1993.
IEE Proceedings D. Control Theory & Applications, vol. 134, No. 6, Nov. 1987, Stevenage GB, pp. 373-387, J. R. Bumby et al. "Optimisation and Control Of A Hybrid Electric Car."
IECEC-89, vol. 2, 11 Aug. 1989, Washington, D.C., U.S. pp. 737-741, W. B. Lawrance et al. "Microprocessor Control Of A Hybrid Energy System", p. 737.

*Primary Examiner*—William M. Shoop, Jr.
*Assistant Examiner*—Brian Sircus
*Attorney, Agent, or Firm*—Finnegan, Henderson, Farabow, Garrett & Dunner

[57] ABSTRACT

A drive control apparatus for a series hybrid vehicle. The series hybrid vehicle includes an engine, a generator, a battery and a motor. The generator is activated by electricity from the engine so as to drive the motor. The battery is charged by the electricity from the generator, being discharged so as to provide a voltage to the motor. In other words, the motor is also activated by discharging electricity from the battery. There are three modes for activating the motor, i.e. a mode for activating the motor only by the battery, a mode for activating it only by the generator, and a mode for activating it both by the battery and the generator. The motor activating modes will be selected depending upon a required motor output. An output voltage of the generator is determined so as to derive the required output according to the selected mode. The generator is of a type which can output a voltage according to a field current. The field current of the generator is controlled so as to obtain the required output voltage.

16 Claims, 11 Drawing Sheets

DRIVE CONTROL APPARATUS OF SERIES HYBRID VEHICLE

BACKGROUND OF THE INVENTION

1. Field of the Invention

This invention relates to a drive control apparatus for a series hybrid vehicle (called "SHV" hereinafter), and more particularly to a drive control apparatus for controlling a motor to be installed in the SHV.

2. Description of the Related Art

A variety of hybrid vehicles (called "HV" hereinafter) having an engine and a driving motor as driving apparatuses have been proposed up to now. The HVs are roughly classified into parallel hybrid vehicles (PHVs) and SHVs. Usually, the SHV has a configuration as shown in FIG. 15.

Figure 15:
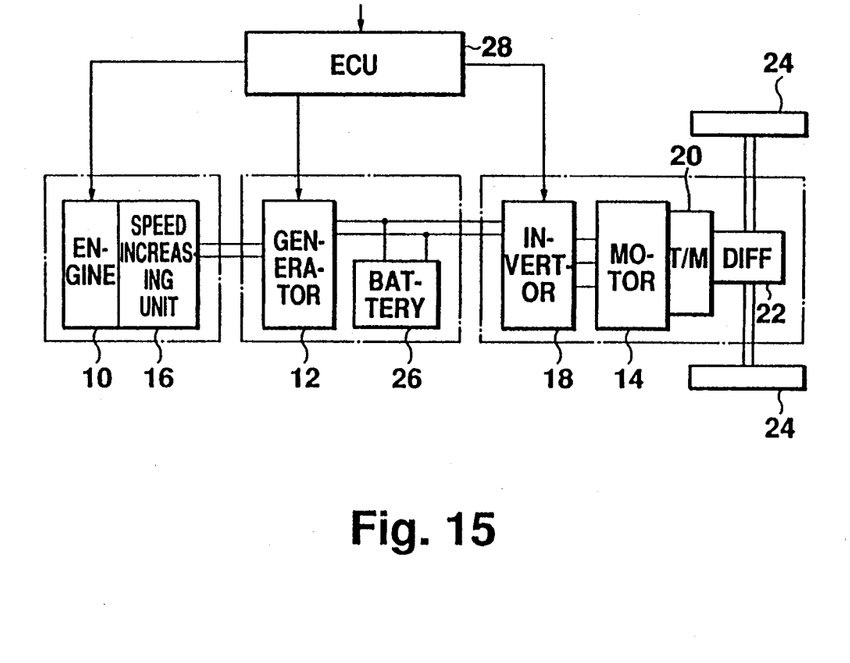
FIG. 15 is a block diagram showing a typical SHV.

In FIG. 15, the SHV includes an engine 10, a generator 12 and a motor 14. The generator 12 is a d.c. generator to be rotatably driven by the engine 10. The engine 10 and the generator 12 are mechanically connected via a speed increasing unit 16. The speed increasing unit 16 increases the number of rotations of the engine 10 so as to be compatible with the generator 12.

The generator 12 supplies its output to the motor 14 via an invertor 18, which converts the received output into 3-phase a.c. electricity, and provides it to the motor 14. The motor 14 is a 3-phase a.c. motor, of which mechanical output is transmitted to wheels 24 via a differential gear 22 and so on.

The invertor 18 also receives d.c. electricity from a main battery 26. In other words, the motor 14 can be selectively driven by the electricity either from the generator 12 or the battery 26. For instance, when the engine 10 is inoperative, the generator 12 cannot supply the electricity to the motor 14, so that the motor is driven by the electricity solely from the main battery 26. Since the main battery 26 is a chargeable and dischargeable type, it can be charged by a regenerated power from the motor 14, a charger (not shown), or the like. The main battery 26 can supply the electricity to electric appliances mounted on the vehicle via an auxiliary battery.

The engine 10, generator 12, invertor 18 and other units are controlled by an electronic control unit ECU 28. Specifically, the ECU 28 controls the operation of components of the vehicle such as fuel injection into the engine 10, excitation of the generator 12, and the switching of transistors in the invertor 18 using a pulse width modulation (PWM) signal. For instance, the ECU 28 receives a signal indicating the extent of a driver's stepping on an accelerator or brake pedal. Based on the signal, the ECU 28 controls a speed of the engine 10 and an excitation voltage of the generator 12, providing the invertor 18 with the PWM signal, and controlling the vector of a primary current of the motor 14.

With the foregoing SHV, the motor 14 is selectively driven by the electricity either from the generator 12 or the main battery 26.

Selection of either the generator 12 or the main battery 26, or use of both of these power sources depends upon the acceleration performance or other factors of the vehicle so as to satisfy the desired specification. For instance, it is preferable to set up a power supplying plan in which only the generator 12 is used to supply an output in a given range.

Up to now, PHVs in which either an engine or a battery, or the engine and battery is selectively used as a drive source are known (refer to Japanese Patent Publications Sho 62-27603 and Sho 62-27604). By using the techniques disclosed in these references, it is possible to control the supply of power for the SHV.

With the prior art, selection of the drive sources is mechanically performed, which causes undesirable shocks at the time of selection.

SUMMARY OF THE INVENTION

It is therefore an object of this invention to overcome the foregoing problems of conventional control apparatuses, and to provide a drive control apparatus for an SHV which can control power allotment for the engine and battery without mechanical switching therebetween.

To accomplish the foregoing object, there is provided a drive control system comprising: a) means for selecting a mode to activate a motor solely by a battery, a mode to activate the motor solely by a generator, or a mode to activate the motor by the generator and the battery according to a required motor output; b) means for determining an output voltage of the generator according to the selected motor activating mode so as to obtain the required motor output; and c) means for controlling a field current of the generator so as to obtain the determined output voltage. In this case, it is preferable to monitor the output voltage of the generator, an output current of the battery, and a speed of the engine or an output current of the generator.

In the foregoing arrangement, a mode for activating the motor is first of all determined. There are three modes for activating the motor, i.e. the mode for activating the motor solely by the battery, the mode for activating it solely by the generator, and the mode for activating it both by the battery and the generator. One of the modes which can accomplish the required motor output will be selected. Thereafter, an output voltage of the generator will be determined so as to obtain the required motor output under the selected motor activating mode.

Furthermore, a field current of the generator is controlled so as to obtain the determined output voltage of the generator. The output voltage of the generator, the output current of the battery, and the engine speed or the output current of the generator are monitored for effective control of the field current.

According to the invention, to supply the power to the motor, the generator and the battery are switched by control of the field current of the generator without causing any mechanical shocks between them.

The drive control system can also include a means for interrupting the field current of the generator when the output voltage of the generator exceeds a preset value. This arrangement prevents the boost of a voltage to be supplied from the generator due to disconnection of a battery terminal. The interruption of the field current attracts the driver's attention, so that the driver can proceed with emergency controlling of the vehicle.

BRIEF DESCRIPTION OF THE DRAWINGS

FIGS. 3A and 3B show output characteristics of a generator used in the apparatus of FIG. 1. Specifically.

DESCRIPTION OF THE PREFERRED EMBODIMENTS

Embodiments of this invention will now be described with reference to the accompanying drawings.

Figure 1:
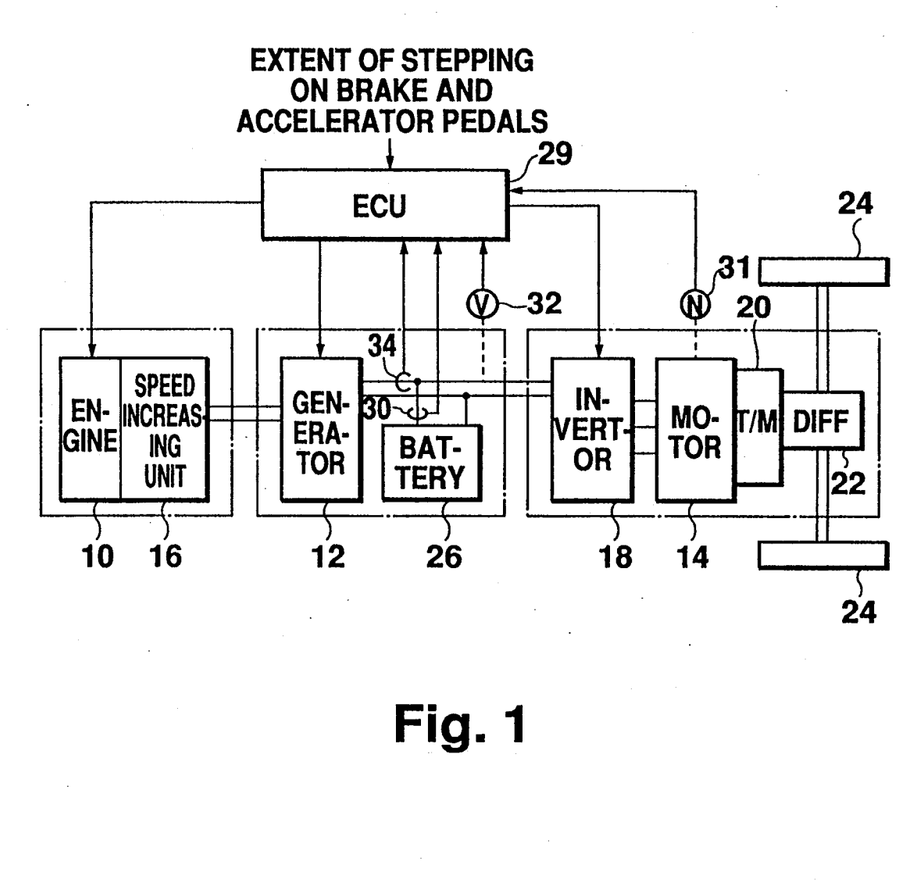
FIG. 1 is a block diagram showing a drive control apparatus according to a first embodiment of this invention.

FIG. 1 shows a drive control apparatus, for an SHV, according to a first embodiment of the invention. The SHV includes drive means (engine 10, generator 12, motor 14, and so on) which are similar to those of the apparatus shown in FIG. 15. Therefore, parts similar to those of FIG. 15 are designated by like reference numerals, and repetition of description is omitted.

Figure 2:
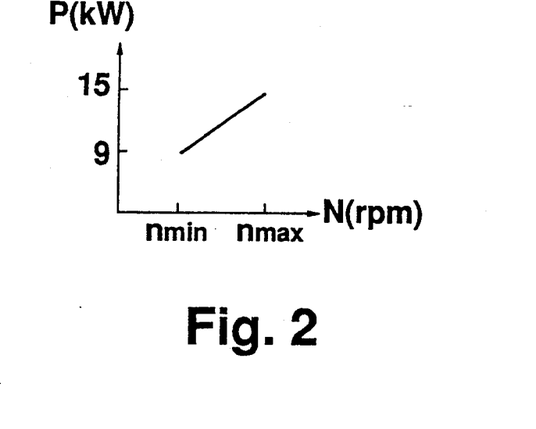
FIG. 2 shows an output characteristic of an engine used in the apparatus of FIG. 1.

The engine 10 operates on the WOT (wide open throttle) principle. The WOT means that the output of the engine 10 is controlled by adjusting the amount of fuel to be supplied thereto while a throttle is fully open, so that the engine 10 can operate with high efficiency. The engine 10 in this embodiment is of a high efficiency type. Specifically, the engine 10 has a characteristic that its output P(kW) and speed N (rpm) is in the ratio of one to one within a given output range and a given speed range, as shown in FIG. 2.

Figure 3A:
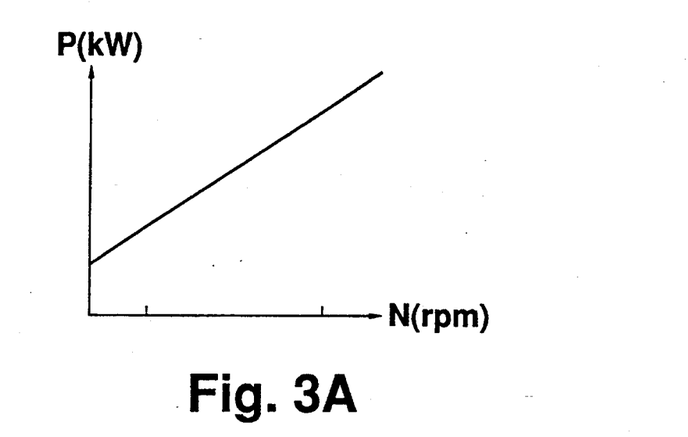
FIG. 3A shows a relationship between electrical power and an engine speed.

The generator 12 is of a high efficiency type, and is rotatably driven by the engine 10 via a speed increasing unit 16. The generator 12 varies its output P(kW) with the engine speed N (rpm) as shown in FIG. 3A, and has its output voltage (V) controlled by a field current (an excitation current).

The motor 14 is an a.c. motor so as to have a long life, reliable rotation and fail-safe performance, and so forth. The motor 14 is activated by the invertor 18.

In this embodiment, the drive control apparatus includes an ECU 29 to control the various components. The ECU 29 receives signals indicating the extent of stepping on an accelerator pedal and a brake pedal. In response to this signal, the ECU 29 controls the amount of fuel injection into the engine 10, the excitation current of the generator 12, and a primary current of the motor 14 (i.e. the PWM operation of the invertor 18).

The drive control apparatus also includes a current sensor 30 for detecting the output current of the main battery 26, a voltage sensor 32 for detecting voltages to be input to the invertor 18 from the generator 12 and the main battery 26, and another current sensor 34 for detecting the output current of the generator 12. All of the detected values are input to the ECU 29. In operation, the ECU 29 controls drive modes of the motor 14 according to the motor output supplying map. This map is determined based on the required acceleration performance of the vehicle, and characteristics and efficiency of various components of the apparatus. For example, the ECU 29 switches between a mode to drive the motor 14 with the output only from the main battery 26 and a mode to drive the motor 14 with outputs from both the engine 10 and the generator 12. The ECU 29 carries out this process according to the values detected by the sensors 30, 32 and 34, thereby controlling the field current of the generator 12.

Figure 4:
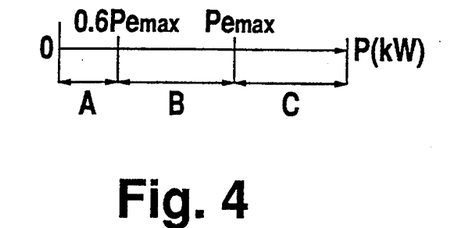
FIG. 4 is a map for determining regions in which a motor receives electricity from a battery, an engine, or a combination of the battery and the engine.

FIG. 4 shows the map for determining in which region the motor receives electricity from the battery, the engine, or combination of the battery and the engine. The map has three regions A to C. In the region A, the motor 14 is operated only by the main battery 26. In the region B, the motor 14 is operated only by the engine 10, and in the region C, it is operated by both the engine 10 and the main battery 26. This map is determined to satisfy the required acceleration performance and other factors when designing the drive control apparatus.

Figure 5:
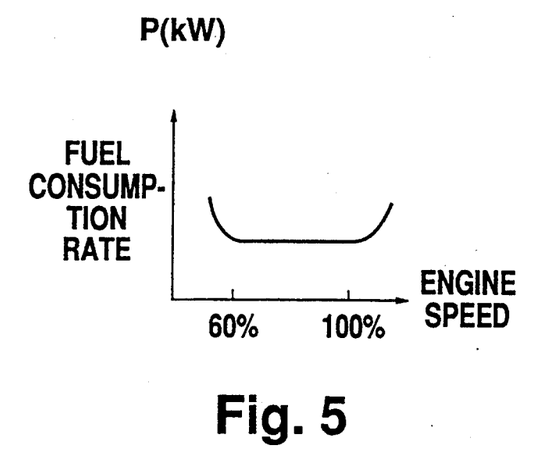
FIG. 5 shows a fuel consumption rate of the engine in the embodiment of FIG. 1.

Specifically, the region B is determined considering a high efficiency region or range of the engine 10. As described above, the engine 10 has a limited output range, which represents that the engine can operate efficiently within the limited output range. In other words, when the output of the engine 10 is within a given range, e.g. 60% to 100%, of its maximum output Pemax, the engine 10 can operate with a low fuel consumption as shown in FIG. 5.

Figure 6:
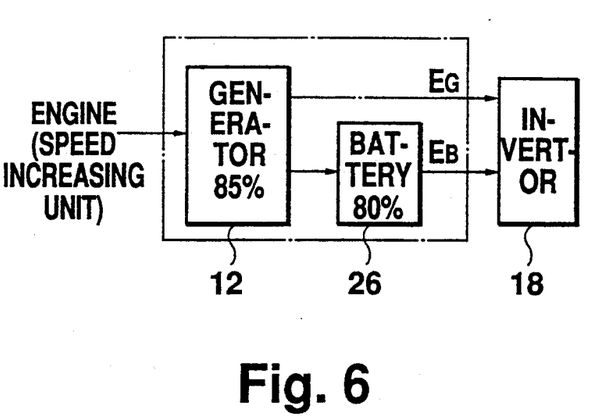
FIG. 6 is a simplified schematic illustrating the dependency of the electrical power $E_G$ upon the conversion efficiency of the generator and upon the charge and discharge efficiency of the main battery.

The main battery 26 is charged by the output of the generator 12. Assume that electrical power $E_G$ is supplied to the invertor 18 from the generator 12, and that electrical power $E_B$ is supplied to the invertor 18 from the main battery 26. As shown in FIG. 6, the electrical power $E_G$ depends upon the conversion efficiency of the generator 12 (ratio of a mechanical input to an output electrical power of the generator 12). On the other hand, the electrical power $E_G$ depends upon not only the conversion efficiency of the generator 12 but also the charge-and-discharge efficiency of the main battery 26. For instance, the conversion efficiency of the generator 12 is 85% and the charge-and-discharge efficiency of the main battery is 80%. Therefore, influence of the charge-to-discharge rate of the main battery 26 on the electrical power $E_G$ cannot be ignored when designing the map used for supplying the electricity to the invertor 18. In other words, the electrical power $E_G$ can be supplied to the invertor 18 with a low loss compared with the electrical power $E_B$.

In view of electricity supply, it is preferable to use only the engine 10 to drive the motor 14 in the region between 0.6 Pemax and Pemax where the engine 10 is operated with a low fuel consumption and not to use the main mattery 26. If the battery 26 were used for supplying electricity in the region between 0.6 Pemax and Pemax, the battery 26 would need to have a large capacity. The larger capacity the battery 26 has, the more bulky and heavier it becomes when installed in a vehicle. Therefore, the motor should be operated only by the engine 10 in the region B of 0.6 Pemax to Pemax so as to assure efficient and reliable operation and reduction in the size and weight of the vehicle. In the region of less than 0.6 Pemax, i.e. region A, the motor 14 is activated only by the main battery 26 since it is difficult to operate the engine 10 with a low fuel consumption and low emission. In the region of more than Pemax, i.e region C, the motor 14 is activated both by the main battery 26 and the engine 10 which is operable with the low fuel consumption and low emission.

Figure 7:
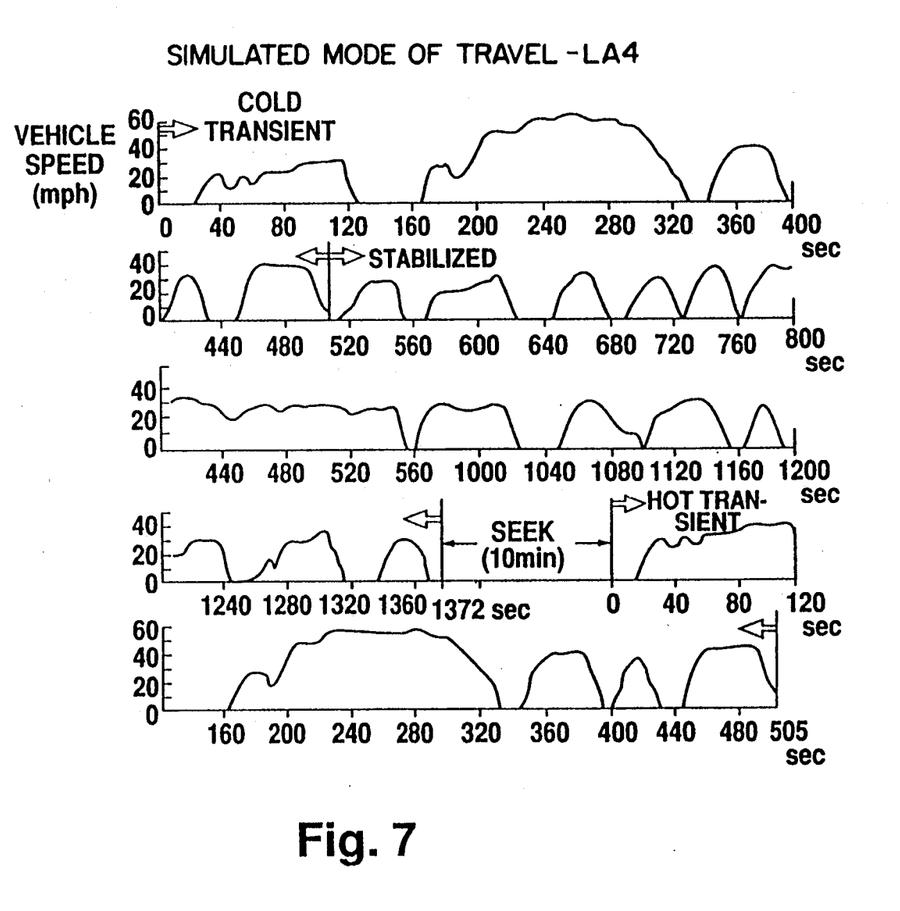
FIG. 7 shows the change in vehicle speed over time in a simulated mode of travel.

To establish these regions, it is necessary to determine the maximum output Pemax of the engine 10. For this purpose, a certain travelling mode (e.g. a travelling mode LA4 shown in FIG. 7) is simulated to determine an engine operating condition. By this simulation, variations of the power $E_G$ from the generator 12 to the invertor 18 and variations of the power $E_B$ from the main battery 26 to the invertor 18 are obtained by varying the maximum output Pemax of the engine 10.

Figure 8:
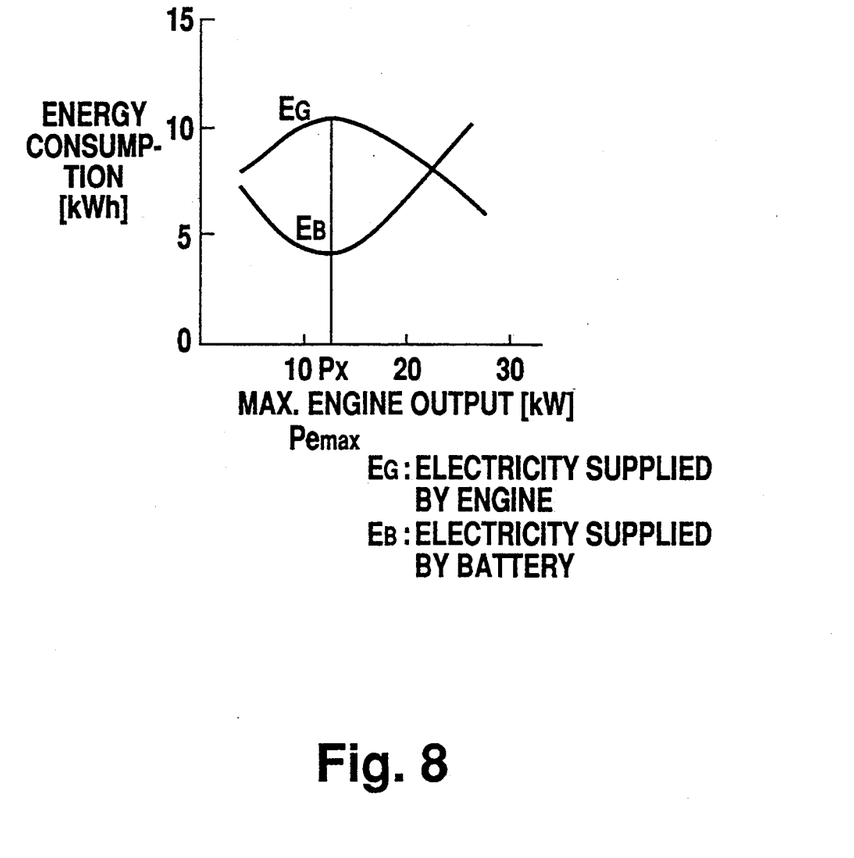
FIG. 8 is a graph showing the variations of electrical powers $E_G$ and $E_B$ that result during the simulated mode of travel illustrated in FIG. 7.

FIG. 8 is a graph showing the variations of the power $E_G$ and $E_B$ derived from the simulation. As can be seen from FIG. 8, the power $E_G$ is maximum and the power $E_B$ is minimum at an engine output value Px when the variation of the maximum output Pemax of the engine 10 is varied. Since the power $E_B$ from the main battery 26 depends upon the charge-and-discharge efficiency thereof and it is preferable to make the main battery with a smaller capacity, the maximum output Pemax is preferably Px as shown in FIG. 4.

Figure 9:
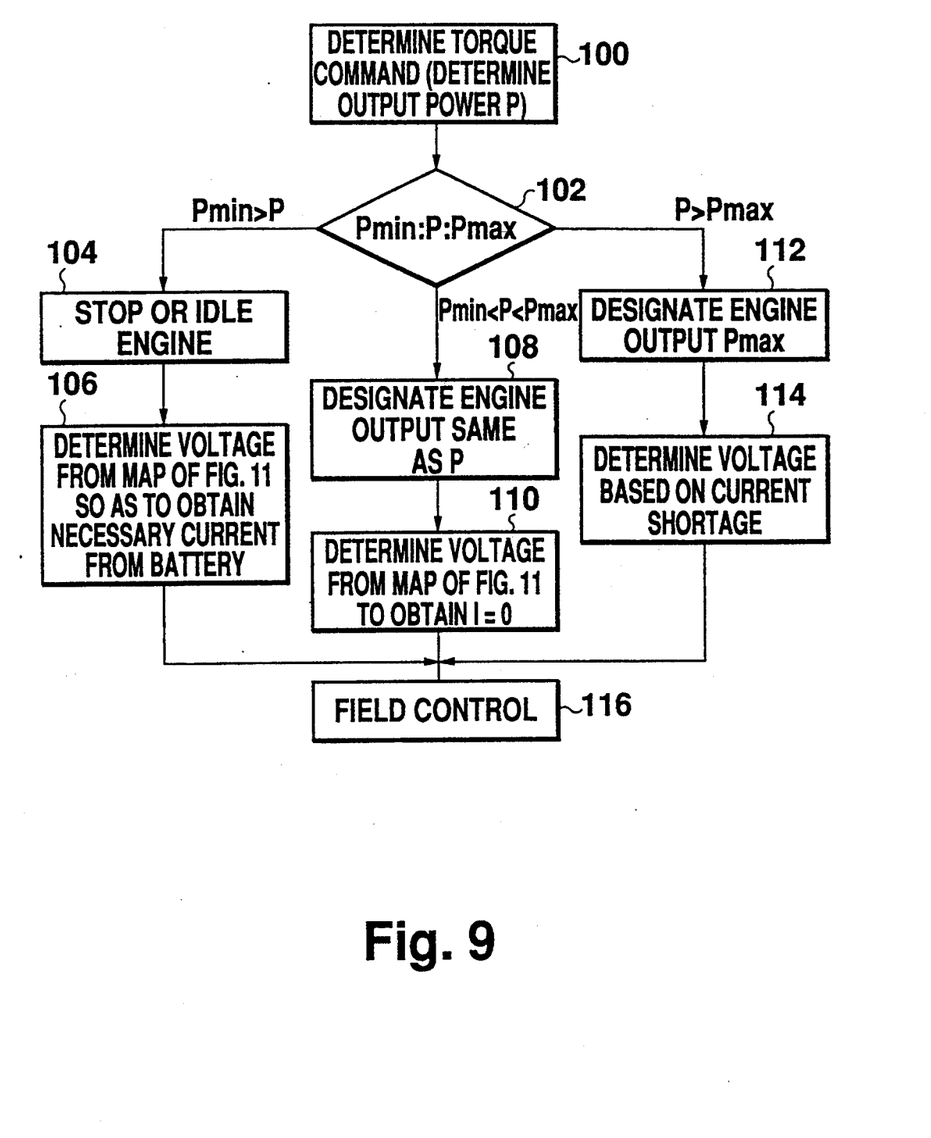
FIG. 9 is a flowchart showing the operation of the ECU shown in FIG. 1.

In this embodiment, the ECU 29 performs the field control of the generator 12 so as to select the output regions according to the map. FIG. 9 is a flowchart showing this control.

Figure 10:
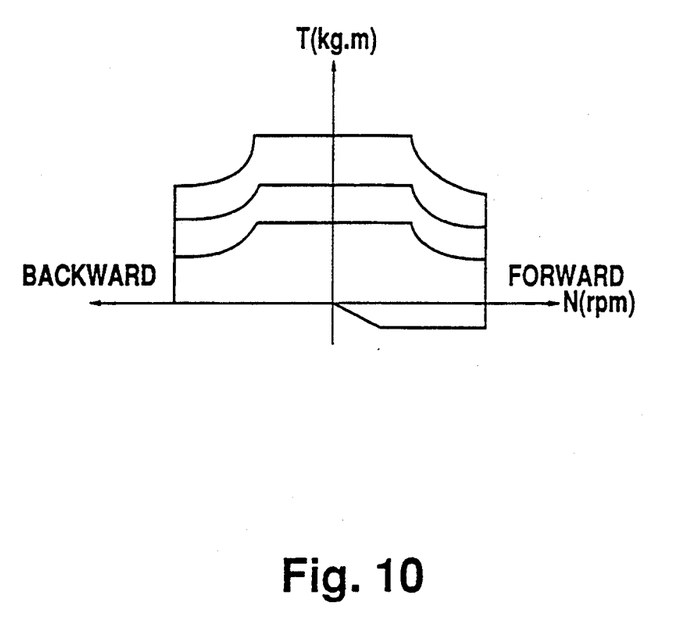
FIG. 10 is a map to be used for determining a torque command.

As shown in FIG. 9, the ECU 29 first determines a torque command value (step 100). The torque command value is determined based on the extent of stepping on the accelerator pedal, and the speed of the engine 10 detected by the speed sensor 31. Specifically, the torque command value is determined according to the torque map in FIG. 10. Then, according to a determined torque command value, the ECU 29 provides a PWM signal to the invertor 18 so as to control an output torque of the motor 14.

The a.c. motor 14 has the output torque in proportion to the mechanical output thereof. Therefore, the determination of the torque command value in the step 100 corresponds to the determination of the output P(kW) to be instructed to the motor 14. Thereafter, the ECU 29 compares the output P to be instructed to the motor 14 with Pmax and Pmin (step 102).

In this comparison, Pmax corresponds to the foregoing Pemax and Pmin to the foregoing 0.6 Pemax. In other words, the ECU 29 checks to which region (A, B or C) the required output P belongs (step 102).

Figure 11:
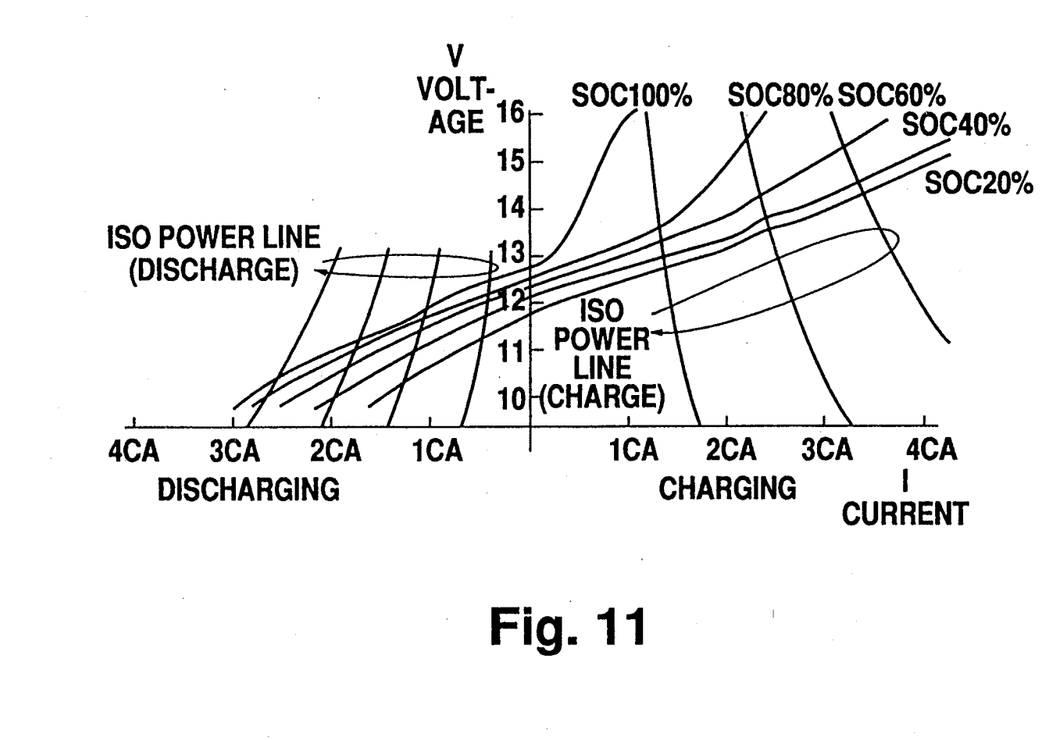
FIG. 11 is a graph showing battery characteristics.

When the output P is found to be in the region A, the ECU 29 firstly stops or idles the engine 10 (step 104). Secondly, the ECU 29 determines the value of a voltage to be supplied to the invertor 18, i.e. an output voltage value of the main battery 26, according to the voltage map of FIG. 11 (step 106). The voltage map of FIG. 11 shows a relationship between the output current I(A) of tile battery and the output voltage V (V). State of charge (SOC) of the main battery 26 is used as a parameter. The ECU 29 determines the value of the output voltage of the main battery 26 so as to obtain the output P to be supplied to the motor 14.

When the desired output P is found to be in the range B, the ECU 29 designates the required output P to the engine 10 (step 108). As described above, the engine 10 is activated based on the WOT in which the engine speed N and the output P correspond to each other on a one-to-one basis (refer to FIG. 2). Therefore, the engine speed N can be controlled by the amount of the fuel to be injected. In step 108, the output P is actually designated in terms of the amount of fuel to be injected into the engine 10. Specifically, the ECU 29 determines the output voltage V according to the map of FIG. 11 so as to nullify the output current I from the main battery 26 (step 110).

When the desired output P is in the region C, the ECU 29 designates Pmax to the engine 10 (step 112). Pmax is designated by controlling the amount of fuel injection as in the step 108. Since the required output P exceeds Pmax in the region C, the amount of shortage P-Pmax should be made up for by an output from the main battery 26. In the succeeding step 114, the ECU 29 determines an output voltage V of the main battery 26 so as to obtain an output current I corresponding to the shortage P-Pmax based on an ISO power line (discharge) related to the necessary power P-Pmax.

After determination of the output voltage V in step 106, 110 or 114, the ECU 29 starts to control the field current of the generator 12 so as to derive the determined voltage V (step 116).

Figure 3B:
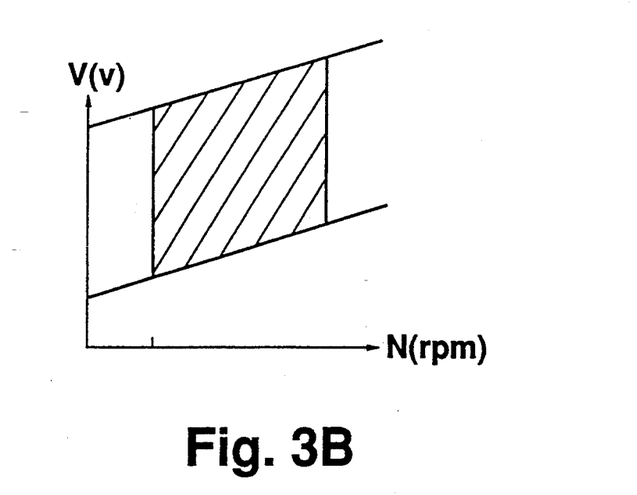
FIG. 3B shows a relationship between a voltage and the engine speed.

Since the engine 10 is inoperative or idling in the region A, the field current corresponding to the voltage V is outside the hatched portion shown in FIG. 3B, which means that no output is available from the generator 12. Thus, only the main battery 26 supplies the electricity to the invertor 18.

In the region B, the ECU 29 controls the field current so that the voltage detected by the sensor 32 becomes equal to the voltage V determined in step 110. For this purpose, the sensor 34 monitors the output current from the generator 12 so as to obtain the desired power, and the sensor 30 monitors the current I of the main battery 26 so as to make the current I zero. Thus, no current I is supplied from the main battery 26, so that the motor 14 is activated only by the output from the generator 12.

With the region C, the ECU 29 controls the field current so that the voltage detected by the sensor 32 becomes equal to the voltage V determined in step 114. For this purpose, the sensor 34 monitors the output current from the generator 12 so as to derive the maximum output Pemax, and the sensor 30 monitors the current I from the main battery 26 so as to obtain the necessary power from both the generator 12 and the main battery 26. Under this condition, the generator 12 produces the maximum output, activating the motor 14 in cooperation with the main battery 26.

In this embodiment, the electricity to activate the motor 14 can be selectively obtained from the generator 12 driven by the engine 10, the main battery 26 or both the generator 12 and the engine 10, so that the motor vehicle can be efficiently operated by considering the efficiency of the engine 10 and the charge-and-discharge efficiency of the main battery 26. Selective use of the foregoing drive sources can be performed by controlling the field current of the generator 12, so that the drive sources can be switched very smoothly without shocks.

Figure 12:
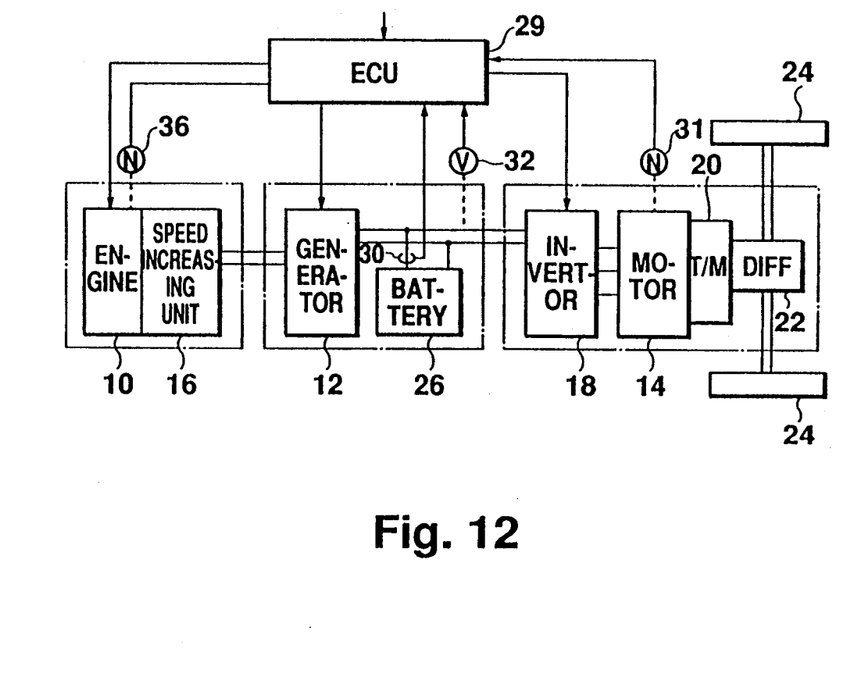
FIG. 12 is a block diagram showing a drive control apparatus according to a second embodiment of the invention.

FIG. 12 shows the configuration of a drive control apparatus according to a second embodiment of the invention. In FIG. 12, parts or elements similar to those of the first embodiments are designated by like reference numerals. In this embodiment, an engine speed sensor 36 is used to detect a speed of the engine 10 in place of the sensor 34 for detecting the output current of the generator 12. As shown in FIG. 2, the engine 10 has its output and speed corresponding to each other on a one-to-one basis, so that this configuration is as effective as that of the first embodiment.

With the configuration in FIG. 1 or in FIG. 2, charge and discharge of the battery 26 can be controlled without the use of a contactor or a snubber circuit, so that it is possible to prevent an abnormal boost of the voltage caused by malfunction of the generator 12. This function will be explained with reference to FIG. 1.

In operation, to charge the main battery 26 by supplying the power B (kW), the ECU 29 makes the sensors 32 and 30 detect the voltage V at an output end of the generator 12, and the output current I of the main battery 26, respectively. The ECU 29 controls the voltage V so as to make the power B equal to VI (B=VI). In other words, the ECU 29 controls not only the amount of fuel to be injected into the engine 10 so as to control the output of the engine 10, but also performs field control of the generator 12. The ECU 29 controls the voltage V to obtain B=VI and the output current of the generator 12 to be (A+B)/V, where A (kW) represents power required by the invertor 18 (motor 14). For this control, the output current of the generator 12 is monitored by the sensor 34, and fed back. For this control, an ISO power line (charge) shown in FIG. 11 is used.

To discharge the main battery 26, the ECU 29 detects the voltage V and the current I by using the sensors 32 and 30, and controls the output voltage V of the generator 12 by the field control so as to obtain VI=A−B. In this control, the output current of the generator 12 is also monitored.

When the main battery 26 is neither charged nor discharged, the output voltage V is controlled so as to make I=0 as in the region B.

As described so far, the configuration according to this invention enables the battery to be charged or discharged without contacting members such as contactors, snubbers and so on.

Figure 13:
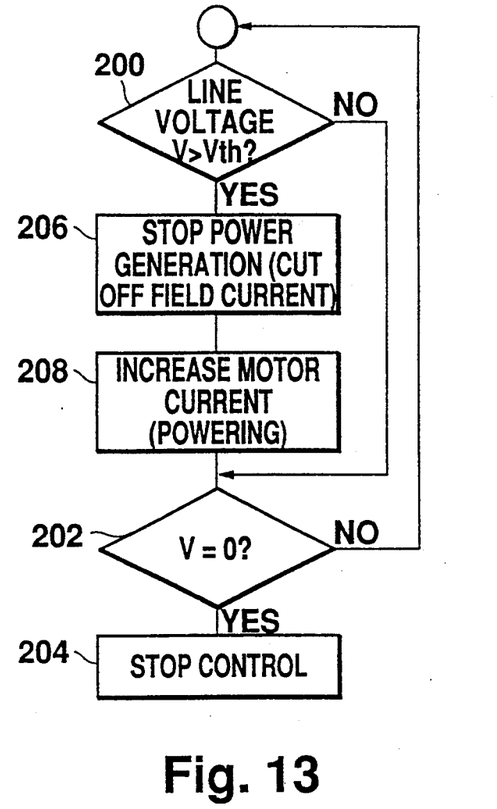
FIG. 13 is a flowchart showing the operation of a drive control apparatus according to a third embodiment.
Figure 14:
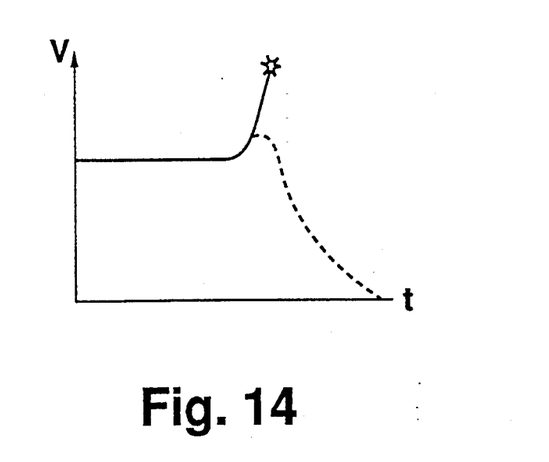
FIG. 14 shows a problem to be solved by the apparatus according to the embodiment shown in FIG. 13.

FIG. 13 is a flowchart showing the operation sequence of a drive control apparatus according to a third embodiment of the invention. The configuration of this embodiment is identical to that of the first embodiment. The drive source for activating the motor is selected as in the first embodiment. This embodiment features that a boost of the voltage V due to disconnection of a terminal can be prevented.

In the configuration of FIG. 1, when the terminal of the main battery 26 is disconnected, the voltage to be applied to the invertor 18 is boosted due to an internal inductance of the generator 12. To prevent this phenomenon, the sensor 32 detects the voltage V, so that the ECU 29 judges whether or not the detected voltage exceeds a preset threshold value Vth (step 200).

If the voltage does not exceed the threshold value Vth, the ECU 29 recognizes that there is no abnormality such as the terminal disconnection, and advances to step 202, where it is checked whether or not the voltage V is 0. When the voltage V is 0, the ECU 29 stops controlling the invertor (step 204). Otherwise, the ECU 29 returns to step 200.

In step 200, when the voltage V is more than Vth, it is considered that the terminal of the main battery 26 might be disconnected. Therefore, the ECU 28 cuts off the field current from the generator 12 so as to interrupt generation of the electricity (step 206).

However, since some energy remains in the generator 12 immediately after the interruption of the field current, the generator 12 keeps on generating electricity. To prevent the voltage V from being boosted by this electricity, the invertor 18 is controlled to power the motor 14 (step 208). Thereafter, the residual energy in the generator 12 is reset, thereby preventing a boost of the voltage by the residual energy. The residual energy is not so large that it is reset by powering the motor 14 in step 206. Thus, no large shock will be caused during regeneration or when the vehicle stops travelling. No large torque will be caused either. Thereafter, the ECU 28 advances to step 202.

According to this embodiment, it is possible to prevent the voltage boost due to the disconnected terminal of the main battery 26, and malfunction of the invertor 18. The driver can recognize an abnormality according to the interruption of the motor 14, and can proceed with emergency controlling the vehicle against the abnormality. This process is not shown. Thereafter, the driver can bring the vehicle to a repair shop while using the normal components.

With this invention, the motor is selectively activated by the generator, battery, or combination of the generator and battery by controlling the field current of the generator, so that the selection of the drive source can be carried out very smoothly without mechanical shocks. Furthermore, it is possible to prevent the boost of voltage caused by the disconnected terminal of the battery since the field current is interrupted in response to the detected results of voltage. Thus, the drive can take remedial measures according to the interruption of the motor.

What is claimed is:

1. A drive control system for controlling a series hybrid vehicle having an engine, a generator, a battery, and a motor, wherein an output of said engine activates said generator so as to generate an output voltage according to a field current, an output voltage of said generator charges said battery, and wherein the output voltage from said generator and/or the voltage supplied from said battery activates said motor, said drive control system comprising:

means for selecting a mode to activate said motor solely by said battery, a mode to activate said motor solely by said generator, or a mode to activate said motor by said generator and said battery according to a required motor output;

means for determining an output voltage for said generator according to the selected motor activating mode so as to obtain the required motor output; and means for controlling a field current of said generator so as to obtain the determined output voltage, thereby selecting a motor activating mode in which the motor operates.

2. A drive control system according to claim 1, further including:

means for detecting the output voltage of said generator;

means for detecting an output current of said battery; and means for detecting an engine speed;

wherein said field current control means controls the field current of said generator based on the detected values of the output voltage of said generator, output current of said battery, and engine speed of said engine so as to obtain the determined output voltage.

3. A drive control system according to claim 1, further including:
means for detecting an output voltage of said generator;
means for detecting an output current of said battery; and
means for detecting an output current of said generator;
wherein said field current control means controls the field current of said generator based on the detected values of the output voltage, the output current of said generator, and the output current of said battery so as to obtain the determined output voltage.

4. A drive control system according to claim 1, further including means for controlling the amount of fuel to be injected into said engine;
wherein said engine has its speed and output corresponding to each other on a one-to-one basis within a preset engine speed range, and has its speed controlled by the amount of fuel injection.

5. A drive control system according to claim 1, wherein said mode selecting means selects a mode for activating said motor with reference to an output supplying map which shows a correspondence between required motor outputs and motor activating modes.

6. A drive control system according to claim 5, further including a means for controlling the amount of fuel injection into said engine;
wherein said engine has its speed and output corresponding to each other on a one-to-one basis within a preset engine speed range and has high efficiency, and has its speed controlled by the amount of fuel injection; and
wherein said output supplying map specifies a region which corresponds to the mode for activating said motor solely by said generator so as to obtain the required output within the preset engine speed range, a region which corresponds to the mode for activating said motor solely by said battery so as to obtain the required output in a range below the preset engine speed range, and a region which corresponds to the mode for activating said motor both by said generator and said battery so as to obtain the required output in a range above the present engine speed range.

7. A drive control system according to claim 6, wherein said present engine speed range is plotted based on a simulated travelling condition of the vehicle.

8. A drive control apparatus according to claim 1, wherein said motor is an a.c. motor to be activated by a.c. electricity, and wherein the hybrid vehicle includes an invertor for converting an output voltage of said generator and/or a voltage supplied from said battery into an a.c. voltage.

9. A drive control system according to claim 8, further including:
means for determining a command value according to an extent of driver's request; and
means for controlling said invertor according to the determined command value;
wherein said mode selecting means selects a motor activating mode by using the determined command value as the required motor output.

10. A drive control system according to claim 1, further including:
means for detecting an output voltage of said battery;
means for detecting charge and discharge currents of said battery; and
means for controlling charging of said battery by controlling the field current of said generator;
wherein charge control of said battery is executed so that a product of the detected output voltage of said battery and the detected charge current of said battery is equal to the target charging power and that an output power of said generator is equal to the sum of the target charging power of said battery and power to be supplied to said motor.

11. A drive control system according to claim 10, further including a means for detecting an output current of said generator, wherein said charge and discharge control means control charging and discharging of said battery according to the detected output current value of said generator.

12. A drive control system according to claim 1, further including:
means for detecting an output voltage of said generator; and
means for interrupting the field current of said generator when the output voltage of said generator is equal to or larger than a preset value.

13. A drive control system according to claim 12, further including a means for consuming energy remaining in said generator after the interruption of said field current in said generator.

14. A drive control system according to claim 13, wherein said consuming means consumes the residual energy in said generator by powering said motor so that said motor consumes the residual energy.

15. A drive control system according to claim 14, wherein said motor is activated by a.c. electricity, the series hybrid vehicle includes an invertor for converting an output voltage of said generator and/or a voltage supplied from said battery into an a.c. voltage which is supplied to said motor, and said reset means controls the conversion operation of said invertor so as to power said motor.

16. A drive control system according to claim 1, wherein output wiring of the generator and discharge wiring of the battery are directly connected.

* * * * *

UNITED STATES PATENT AND TRADEMARK OFFICE
CERTIFICATE OF CORRECTION

PATENT NO. : 5,428,274
DATED : June 27, 1995
INVENTOR(S) : Masayuki Furutani et al.

It is certified that error appears in the above-indentified patent and that said Letters Patent is hereby corrected as shown below:

Claim 6, column 9, line 52, change "present" to --preset--.

Claim 8, column 9, line 56, change "apparatus" to --system--.

Signed and Sealed this

Second Day of January, 1996

Attest:

BRUCE LEHMAN

Attesting Officer     Commissioner of Patents and Trademarks